US005234596A

United States Patent [19]

Greeb

[11] Patent Number: 5,234,596

[45] Date of Patent: Aug. 10, 1993

[54] PROCESS FOR COMPOSTING ORGANIC WASTE OR SEWAGE SLUDGE CONTROLLED BY MONITORING EXHAUST AIR

[75] Inventor: Herbert Greeb, Dillenburg, Fed. Rep. of Germany

[73] Assignee: Licencia-Holding S.A., Luxemburg, Luxembourg

[21] Appl. No.: 822,468

[22] Filed: Jan. 17, 1992

[30] Foreign Application Priority Data

Jan. 25, 1991 [DE] Fed. Rep. of Germany ....... 4102210

[51] Int. Cl.[5] ................ C02F 3/02

[52] U.S. Cl. ................ 210/614; 71/9; 71/12; 71/13; 71/14; 210/620; 436/137

[58] Field of Search ................ 71/9, 11-14; 210/96.1, 221.1, 221.2, 614, 620, 739, 771; 436/137

[56] References Cited

U.S. PATENT DOCUMENTS

| | | | |
|---|---|---|---|
| 4,392,881 | 7/1983 | Kneer | 210/609 |
| 3,138,448 | 6/1964 | Schulze | 71/9 |
| 4,062,770 | 12/1977 | Kneer | 210/614 |
| 4,174,371 | 11/1979 | Bell et al. | 71/12 |
| 4,184,269 | 1/1980 | Kneer | 71/9 |
| 4,249,929 | 2/1981 | Kneer | 210/630 |

FOREIGN PATENT DOCUMENTS

| | | | |
|---|---|---|---|
| 2500014A1 | 12/1975 | Fed. Rep. of Germany | 71/12 |
| 2558255A1 | 7/1977 | Fed. Rep. of Germany | 71/12 |
| 2721349 | 11/1978 | Fed. Rep. of Germany | 71/9 |
| 3800201C1 | 8/1989 | Fed. Rep. of Germany | 71/12 |

*Primary Examiner*—Joseph W. Drodge
*Attorney, Agent, or Firm*—Herbert Dubno

[57] ABSTRACT

A process for controlling the throughput rate of aeration air when composting organic waste and/or sewage sludge migrating through a closed reaction vessel from an inlet opening to an outlet opening while aeration air supplied to the reaction vessel flows countercurrently through it, wherein a measured value corresponding to the $O_2$ content of the waste air evacuated from the reaction vessel is continuously produced and, starting from a minimum value, the throughput rate of the aeration air is increased up to a maximum value until the measured $O_2$ content of the waste air has dropped to its minimum value, and is decreased again when the $O_2$ content of the waste air increases, the minimum value of the throughput rate being the value at which the $O_2$ content of the evacuated waste air just begins to drop as compared to the $O_2$ content of the supplied aeration air, and wherein the throughput rate is controlled between the minimum value and the maximum value as a monotonical descending function of the measured $O_2$ content.

4 Claims, 1 Drawing Sheet

33 ET 22 25 2 13 11 NW 1 AT 20 LZ 12 AF 27 30 SW 19 10

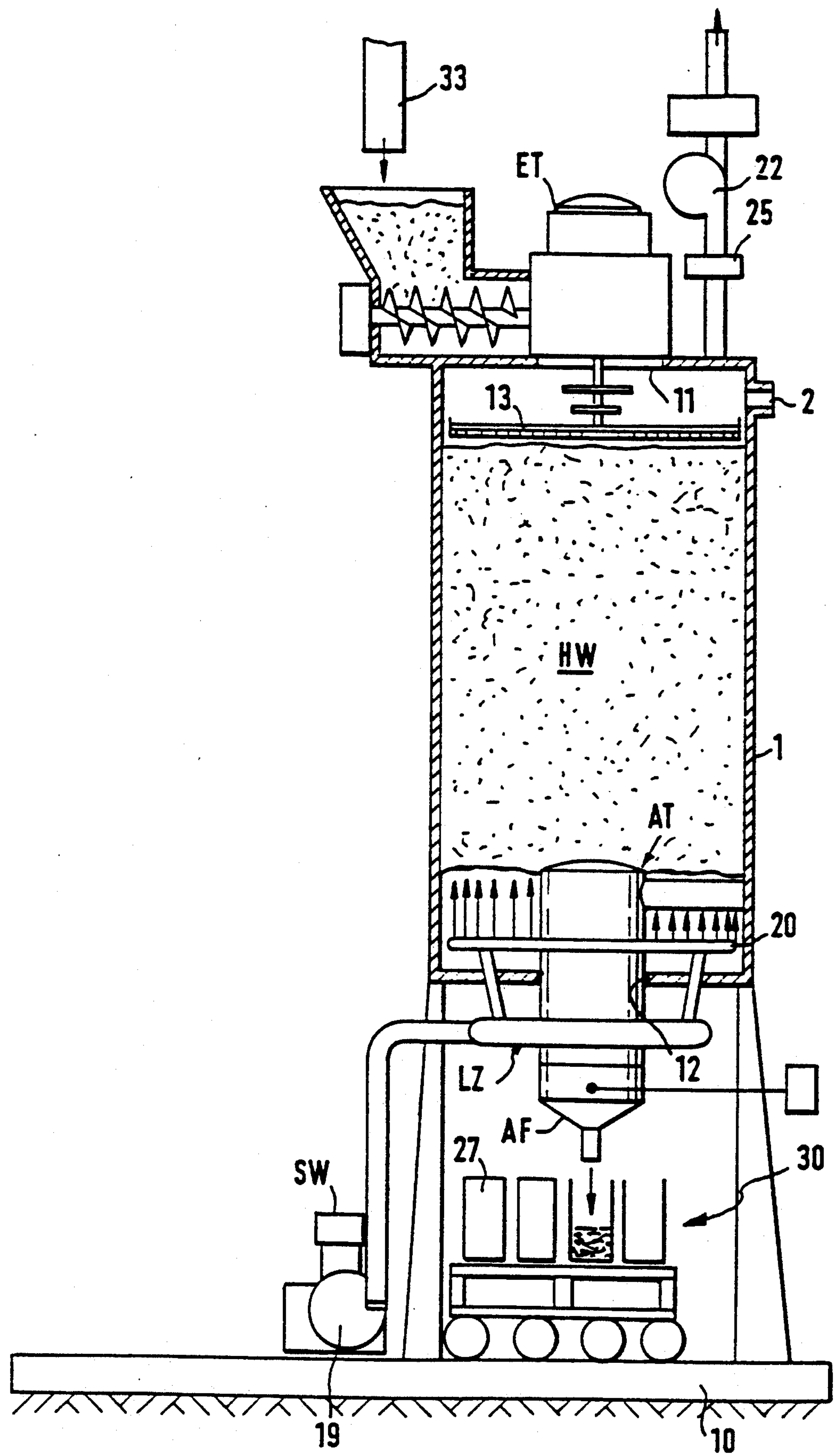
33
ET
22
25
2
11
13
HW
1
AT
20
12
LZ
AF
27
30
SW
19
10

PROCESS FOR COMPOSTING ORGANIC WASTE OR SEWAGE SLUDGE CONTROLLED BY MONITORING EXHAUST AIR

FIELD OF THE INVENTION

The present invention relates to a process for composting organic waste or sewage sludge, and to an apparatus for implementing this process.

More particularly, the invention relates to a process for controlling the throughput rate of aeration air when composting organic waste and/or sewage sludge migrating through a closed reaction vessel from an inlet opening to an outlet opening while aeration air supplied to the reaction vessel flows countercurrently through it, a measured value corresponding to the $O_2$ content of the waste air evacuated from the reaction vessel being continuously produced and, starting from a minimum value, the throughput rate of the aeration air being increased up to a maximum value until the measured $O_2$ content of the waste air has dropped to its minimum value, and being decreased again when the $O_2$ content of the waste air increases.

BACKGROUND OF THE INVENTION

In such a process, which is known from German Patent Specification 3,800,201, the $CO_2$ content of the waste air is used as a measured value corresponding to the $O_2$ content of the waste air evacuated from the reaction vessel, and the throughput rate of the aeration air is controlled as a function of this $CO_2$ content so that always a maximum $CO_2$ content is obtained starting from a given minimum air-throughput, the air throughput is increased at certain switching intervals until the $CO_2$ content reaches a maximum. The air throughput is decreased again after exceeding this maximum when the $CO_2$ content decreases. Thus, in this known process the air throughput is always controlled such that there is a maximal $CO_2$ content, while no suggestion of how to predetermine the minimum air-throughput rate itself is provided.

Further, German Patent Application 2,558,255 discloses a process for composting organic waste or sewage sludge wherein the throughput rate of the aeration air flowing through the reaction vessel is controlled such that the $O_2$ content or the corresponding $CO_2$ content, respectively, of the waste air leaving the aeration reactor takes a desired value which has been set externally. This desired value thus is a fixed value externally set, which either is not altered during the entire composting process, or can be manually corrected externally by inputting a new desired value.

Finally, German Patent Application 2,500,014 discloses a process for composting organic waste or sewage sludge wherein the throughput rate of the aeration air flowing through the reaction vessel is fixedly set without adjustment by means of an adjustment element. In this process, the $O_2$ content or $CO_2$ content, respectively, of the waste air leaving the reaction vessel thus is not considered at all.

OBJECT OF THE INVENTION

The object of the invention is to provide a process as defined above improved in such a manner that the throughput rate of the aeration air flowing through the reaction vessel corresponds as exactly as possible, at any time of operation, to the air quantity required for an optimum composting process.

SUMMARY OF THE INVENTION

This object is achieved according to the invention in that the minimum value of the throughput rate is the value at which the $O_2$ content of the evacuated waste air just begins to drop as compared to the $O_2$ content of the supplied aeration air, and that the throughput rate is controlled between the minimum value and the maximum value as a monotonical descending function of the measured $O_2$ content.

Thus, the process of the present invention is based on the fact that, instead of an adjustment of the $O_2$ content or of the measured value corresponding to the $O_2$ content, respectively, there is effected a control of the throughput in a closed control cycle according to an optimum criterion, so that the throughput rate is always a value which is controlled in a manner to be most favorable both with respect to the reaction process and the fan power required.

According to the invention, the throughput rate control is effected within a range limited by a minimum value and a maximum value, the minimum value being the value at which the $O_2$ content of the evacuated waste air just begins to drop as compared to the $O_2$ content of the supplied aeration air. This ensures that the throughput rate always has at least the minimum value necessary for initiating the biological processes during composting.

Furthermore, according to the invention, the throughput rate is controlled between the minimum value and the maximum value as a monotonical descending function of the measured $O_2$ content. As a result, after initiation of the biological composting processes and after exceeding the minimum activity the throughput rate is always increased only as long as the increase causes an increase in the biological activity, which is shown in a drop of the measured $O_2$ content.

With a view to simplification of the control measures necessary for carrying out the process of the invention it is of special advantage if the throughput is set as a linear function of the measured $O_2$ content or if the function graph is approximated by a step-like function graph, with the approximated function graph on the other hand being either a monotonical descending function of general form or, in particular, a linear function.

It is especially advantageous if the minimum value or the maximum value, or both values, are determined in an initial run and are stored for the further course of the process, so that when further carrying out the process use may be made of the thus prescribed control graph.

Finally, the present invention provides an apparatus for implementing the process of this invention.

BRIEF DESCRIPTION OF THE DRAWING

Hereinbelow, an exemplary embodiment of the invention will be described by making reference to the drawing. The sole FIGURE illustrates an apparatus for composting organic waste and/or sewage sludge in which the process of the present invention is implemented.

SPECIFIC DESCRIPTION

A closed reaction vessel 1 which is circular in section is mounted upright on a base 10 seated in the ground. The reaction vessel 1 has heat-insulating outer walls, and an inlet opening 11 located centrally at the top as well as an outlet opening 12 located centrally at the base. The organic waste or sewage sludge to be composted first of all is supplied via a conveying device 33, and the supplied material then is received in a supply device ET. The conveying element of the supply device ET may, for example, be a conveyor spiral, as shown in the drawing. The supplied material is fed through the inlet opening into the reaction vessel 1, and is distributed evenly by means of a distribution device 13 on the top of a debris HW, i.e. the material already fed in the reaction vessel 1, so that a column of material is formed.

In the lower part of the reaction vessel 1 there is disposed a discharge device AT which is provided with a discharge tool rotating around a shaft centrically located in the reaction vessel, by means of which discharge tool the material is removed evenly from the bottom of the debris column HW and conveyed out of the reaction vessel 1 to the outside through the outlet opening 12. Below the discharge device AT there is disposed a filler mechanism AF by which the discharged material is filled into bags 27 held on a transport device 30.

Further, an air-distributing device 20, which is connected to an aeration device LZ , is disposed in the lower part of the reaction vessel 1, below the rotating discharge tool of the discharge device AT. Fresh air taken from the atmosphere is supplied from a forced-draft fan 19 outside the reaction vessel 1 to the aeration device LZ and, then, into the air-distributing device 20 so that the debris HW in the reaction vessel 1 is supplied with the aeration air from its bottom. This aeration air flows countercurrently through the debris HW in the form of the column of material slowly migrating downwardly in the reaction vessel 1, towards the top of the reaction vessel 1. There, the air is evacuated by means of a suction fan 22 and, after being filtered, released as waste air into the atmosphere or otherwise disposed of.

A sensing device 25 is interposed in the path along which the waste air flows. In this sensing device 25, the $CO_2$ content is measured, the thus obtained measured value representing a measure for the $O_2$ content of the waste air evacuated from the reaction vessel 1. Instead of measuring the $CO_2$ content, the $O_2$ content of the waste air may also be directly measured. The forced-draft fan 19 is controlled by a control device SW as a function of the $O_2$ content of the waste air corresponding to the $CO_2$ content measured in the sensing device 25. The suction fan 22 either may also be controlled by the control device SW, or may dispose of its own control device which is, for example, responsive to the internal pressure in the upper part of the reaction vessel 1. Moreover, a vacuum valve 2 is provided in the upper part of the reaction vessel 1, by means of which the latter becomes connected to the ambient atmosphere if the negative pressure falls below a certain value, in order to prevent the reaction vessel 1 from being damaged as a consequence of an excessive pressure difference caused by any control error.

The throughput rate of aeration air flowing through the column of material is adjusted by the control device SW as a function of the $CO_2$ content measured in the sensing device 25 and corresponding to the $O_2$ content of the waste air evacuated from the reaction vessel 1. The throughput rate is controlled to range between a minimum value and a maximum value as a monotonical descending function of the measured $O_2$ content of the waste air, the minimum value of the throughput rate being the value at which the $O_2$ content of the evacuated waste air just begins to drop as compared to the $O_2$ content of the supplied aeration air, i.e. in case of fresh air supply as compared to the 21% $O_2$ content of the air from the atmosphere. This minimum value of the throughput rate corresponds to the air throughput at which the aerobic composting processes in the reaction vessel 1 are just initiated. Due to the biological decomposition processes taking place, a part of the $O_2$ content of the supplied aeration air is transformed into $CO_2$, so that the $CO_2$ content in the reaction vessel 1 and thus in the evacuated waste air increases, resulting in an increase in the $CO_2$ value measured in the sensing device 25, which is equivalent to a decrease in the $O_2$ content of the waste air. As a consequence of the control of the throughput rate of the supplied aeration air as a monotonously descending function of the $O_2$ content of the waste air determined on the basis of the $CO_2$ measurement in the sensing device 25, the throughput rate of the aeration air is increased when the $O_2$ content drops, which results in further promotion of the aerobic composting processes. The throughput rate of supplied aeration air is increased as a function of the $O_2$ content of the waste air until a specific maximum throughput value is reached. This maximum value corresponds to the maximum biological activity taking place in the reaction vessel 1, which is shown in a maximum $CO_2$ content of the waste air corresponding to the lowest $O_2$ value. The $O_2$ content of the waste air corresponding to this maximum value of the throughput rate may, for example, be 10%, so that when using the air of the atmosphere having an $O_2$ content of 21% as supplied aeration air the $O_2$ content of the evacuated waste air, which is limited by the minimum value and the maximum value, ranges between 21 and 10%. For example, a throughput rate of one time the content of the reaction vessel 1 per hour may be associated with the maximum value of the $O_2$ content, whereas a throughput rate of three times the content of the reaction vessel 1 per hour may be associated with the minimum value of the $O_2$ content.

Between the minimum value and the maximum value of the $O_2$ content, the throughput rate of the supplied aeration air is controlled as a monotonical descending function of the $O_2$ content, i.e. any increase in the $O_2$ content involves a decrease in the throughput rate, and any drop in the $O_2$ content results in an increase in the throughput rate. The control of the throughput rate as a monotonical descending function of the measured $O_2$ content can be effected according to any function graph desired. However, the control is particularly simple if the throughput rate is controlled as a linear function of the measured $O_2$ content. Furthermore, it may be advantageous to approximate the function graph by a step-like form of the control graph, so that there will be no change in the throughput rate of the supplied aeration air within specific ranges of the $O_2$ content. In case of approximation to a linear function graph, the step-like function thus is in the form of intervals of the same length and height.

Naturally, the minimum value of the throughput rate of the aeration air at which the $O_2$ content of the waste air just begins to drop as compared to the $O_2$ content of the supplied aeration air is dependent on the kind of the processed organic waste or sewage sludge, the design of the apparatus, and the individual operating parameters. Similarly, this also applies to the maximum value of the throughput rate corresponding to the maximum biological activity taking place in the reaction vessel 1. Therefore, these values will have to be determined in an initial run when putting the plant into operation, and can be maintained as long as no essential change in the operating conditions occurs. Therefore, a storage means for storing the minimum value and the maximum value is provided in the control device SW. For the case that changing operating conditions which, however, can be foreseen or reproduced are to be expected, this storage means may be designed such that several minimum and maximum values which can be called up depending on the changing operating conditions or parameters are available in it. Also, it may be provided to change the graph of the control function depending on the specific operating conditions.

I claim:

1. A process for controlling a throughput rate of aeration of air when composting organic waste and/or sewage sludge migrating through a closed reaction vessel from an inlet opening to an outlet opening while aeration air supplied to the reaction vessel flows countercurrently through it, said process comprising the steps of:

(a) continuously providing a measured value corresponding to an $O_2$ content of a waste air evacuated from a reaction vessel being continuously produced;

(b) starting from a minimum value, increasing a throughput rate of the aeration air up to a maximum value until a measured $O_2$ content of the waste air has dropped to a minimum value, and being decreased again when the $O_2$ content of the waste air increases;

(c) establishing as the minimum value of the throughput rate a value of the throughput rate at which the $O_2$ content of the evacuated waste air just begins to drop as compared to the $O_2$ content of the supplied aeration air; and (d) controlling the throughput rate between the minimum value and the maximum value as a monotonically descending function of the measured $O_2$ content.

2. A process of claim 1, wherein the throughput rate is controlled as a linear function of the measured $O_2$ content of the waste air.

3. The process of claim 1, wherein a graph of said function is approximated by a step function graph.

4. The process of claim 1, wherein the minimum value and/or the maximum value is determined in an initial run and is stored for the further course of the process.

* * * * *